United States Patent [19]

Sudan

[11] Patent Number: 5,057,546

[45] Date of Patent: Oct. 15, 1991

[54] SEMI-FLEXIBLE OR FLEXIBLE PHENOLIC FOAM COMPOSITION

[76] Inventor: Krishan Sudan, 3125 Cherrier, Ile Bizard, Quebec, Canada, H9C 2J9

[21] Appl. No.: 379,825

[22] Filed: Jul. 14, 1989

[30] Foreign Application Priority Data

Feb. 9, 1989 [ZA] South Africa ................. 89/1010
Jun. 16, 1989 [ZA] South Africa ................. 89/4589

[51] Int. Cl.$^5$ ............................................. C08J 9/14
[52] U.S. Cl. ............................... 521/107; 264/51; 264/321; 521/120; 521/181; 521/918
[58] Field of Search ............ 521/181, 918, 89, 107; 264/51, 321

[56] References Cited

U.S. PATENT DOCUMENTS 4,225,679  9/1980  Pilato ................................. 521/181
4,423,163  12/1983  Doerge .............................. 521/181

FOREIGN PATENT DOCUMENTS 59-124940  7/1984  Japan ................................. 521/181

*Primary Examiner*—Morton Foelak
*Attorney, Agent, or Firm*—Helfgott & Karas

[57] ABSTRACT

A semi-flexible or flexible phenolic foam composition having a substantially open cellular structure. It comprises the reaction product of a mixture of a phenol-aldehyde resin, a surfactant, a blowing agent; optionally a wetting agent and a catalyst. Also within the scope of the present invention is a method for producing a semi-flexible or flexible phenolic foam composition having a substantially opened cellular structure. This method comprises mixing a phenol-aldehyde resin with a surfactant, a blowing agent and optionally a cell opening and wetting agent; curing the mixture by reacting it with an acid catalyst; compressing the cured or semi-cured product below its original thickness and releasing the pressure, thereby obtaining the desired semi-flexible or flexible phenolic foam composition. The semi-flexible or flexible foam thus obtained possesses excellent insulation and flame retardant properties.

28 Claims, 3 Drawing Sheets

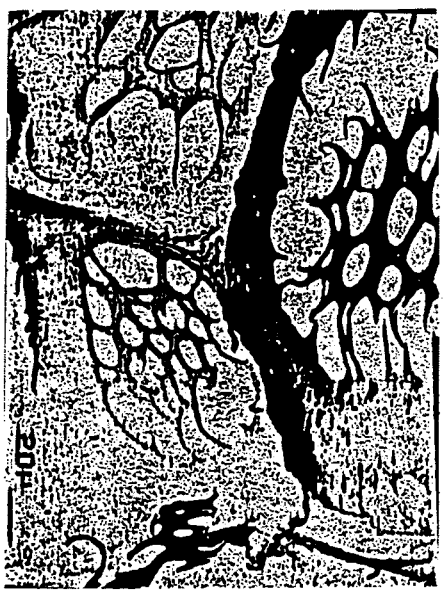
FIG. IA
FIG. IB
FIG. IC
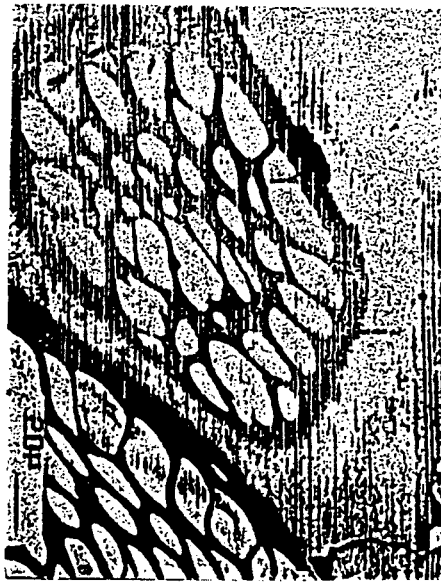
FIG. ID

SEMI-FLEXIBLE OR FLEXIBLE PHENOLIC FOAM COMPOSITION

FIELD OF THE INVENTION

The present invention relates to semi-flexible or flexible phenolic foams having a substantially open cellular structure and to a process for preparing same. The foam of the present invention can be used for insulation, fluid absorption, sound absorption, cushioning and other applications.

BACKGROUND OF THE INVENTION

Phenolic resinous compositions were produced for the first time at the beginning of the 20th century after A. von Baeyer has discovered the reaction between phenols and aldehydes in 1872.

In recent years, there has been an increased interest in phenolic polymers which can be formed into cellular materials more commonly referred to as phenolic foams. Since phenolic foams were mainly viewed as good insulating products possessing excellent flame resistant properties, a large part of the research conducted in the field over the past decades has focused on ways to improve these properties.

Prior to 1968, it was generally taught to use thermosetting phenolic resin foam structures that could be prepared by reacting an acid catalyst with a heat hardenable phenol-aldehyde one step resin, commonly called "resol".

Resols and novolaks are products of the reaction of phenols with formaldehyde and these resins have been used for a variety of applications. Although resols are normally made with formaldehyde, other aldehydes are often used in the event certain desired characteristics are required for the resulting phenolic resin product. Resol can be defined as synthetic resin produced from a phenol and an aldehyde. The molecule contains reactive methylol or substituted methylol groups.

Heating causes the reactive resol molecules to condense together to form larger molecules. This result is achieved without the addition of any substances containing reactive methylene or substituted methylene groups. As for novolak, it is a soluble fusible synthetic resin also produced from a phenol and an aldehyde. However, the novolak molecule does not contain any reactive methylol or substituted methylol groups and is therefore incapable of condensing with other novolak molecules on heating without the addition of hardening agents.

The reaction of an acidic catalyst with a resol resin being exothermic, this creates sufficient heat to convert the water of condensation and any water initially present in the mixture to steam. This steam, which is usually uniformly distributed throughout the resin, foams the reacting resin into a frothy mass and because of the rapid exotherm, the resin converts quickly into an infusible condition before the froth can collapse to any significant extent because of the condensation of the steam. The foam resulting from this type of process was referred to as an "open cell" foam. This type of foam was believed to be undesirable since it did not possess uniform insulating properties.

In an attempt to develop a phenolic foam having improved insulation and flame retarding properties, D'Alessandro produced an improved phenolic resin foam using polyhalogenated saturated fluorocarbons to produce a fine uniform closed cell structure in the phenolic foam. The retention of fluorocarbons in the closed cell structure lead to a higher insulation value.

Since the D'Alessandro patent, it has been established that fluorocarbon blowing agents contribute in deteriorating the ozone layer around the surface of the earth. Therefore, other suitable commercial alternatives need to be sought. Also, the brittleness of the rigid phenolic foams closed or open cell was a major inconvenience.

In 1975, Ernest K. Moss in U.S. Pat. No. 3,876,620 attempted to solve this problem by introducing a phenolic polymer exhibiting a friability of less than 15% when formed into a cellular product. This was achieved by using o-cresol in the phenolic composition.

In 1979, Ernest K. Moss and John Beale in U.S. Pat. No. 4,133,931 further improved on the 1975 Moss invention by providing an improved closed cell phenolic-resin foam material which exhibited low thermal conductivity without adversely affecting friability, compressive strength and the usual low flammability characteristics of this type of material. In this case, good results were achieved by using a branched non-ionic surfactant but now undesirable fluorocarbons were used as blowing agents.

In 1981, Gusmer, in U.S. Pat. No. 4,303,758, disclosed a novel technique through which a closed cell phenol-aldehyde foam product could be obtained. This method involved a frothing and curing technique that was designed by the inventor.

Although phenolic foams have been known and available for many years, they did not penetrate substantially the thermal insulation market until only recently. Two major drawbacks made the commercialization of closed cell phenolic foam in the thermal insulation market difficult. First, closed cell cellular foams tend to loose their insulating properties over time because the brittleness of their structure inevitably leads to he partial breakdown of the closed cell network, thereby releasing the fluorocarbons entrapped in these cells. The entrapped fluorocarbons contribute to enhance the thermal insulation properties of the foam. Also, since all phenolic foams described so far in the prior art are rigid, their compressive strength is usually quite limited and most often unsuitable for normal handling unless extreme care is taken in manipulating the product.

As mentioned earlier, the general composition and method for preparing phenolic foams are well known. Generally speaking, a foamable phenolic resole composition is prepared by admixing a liquid phenolic resole, a blowing agent, a surfactant, and optical additives as well as an acid curing agent into a substantially uniform composition. The curing catalyst is usually added in amounts sufficient to initiate the highly exothermic curing reaction. This step, usually referred to as the foaming step, is most often conducted or performed in a cavity mold or a continuous laminating machine.

When it is desired to manufacture phenolic foam insulation boards, the various ingredients are mixed until a substantially uniform composition is obtained. This composition is then applied onto a protective covering such as cardboard to which it will initially adhere. The foam is then covered with an other protective covering such as cardboard. The covered foaming composition is then passed into a double-belt press-type apparatus where the curing exotherm continues to vaporize and expend the blowing agent, thereby forming the composition as it is cured.

All the processes mentioned above lead to rigid phenolic foams exhibiting varying degrees of compressive strength properties. Therefore, the closed cell phenolic foams designed so far face two major problems. First, they are allowed to contain entrapped fluorocarbons for a somewhat higher insulation value but which are detrimental to the earth's atmosphere. Secondly, in many prior art phenolic foams, when cell walls are subjected to high temperatures or to external pressure, the cell walls cannot resist to these pressures and crack. Obviously, cracking of the cell walls allows the fluorocarbon blowing agents to leak out during curing or over time which consequently decreases the insulation properties of the product.

Mendelsohn et al. and Smith, respectively in U.S. Pat. Nos. 4,107,107 and 4,350,776, designed phenolic foams that could be used as high compressive strength, non-flammable materials while possessing low friability properties. In the case in U.S. Pat. No. 4,107,107, the result was achieved by using a process requiring both a dual surfactant and a dual acid system. Still, the phenolic foam described in U.S. Pat. No. 4,107,107 is a rigid foam system with or without entrapped fluorocarbons.

In the case of U.S. Pat. No. 4,350,776, the inventor used a furfuryl-alcohol polymer to obtain a low friability and flame resistant thermosetting foam. This foam is also a rigid phenolic foam product having entrapped therein suitable blowing agents such as fluorinated compounds.

In both cases, however, the final product still has a rigid form and even though compression properties have been improved, the foam is still friable.

Thus, substantially rigid phenolic foams have been known for many years. The rigidity and friability of these foams and the inherent lack of elastic deformation characteristics are such that these foams can be easily damaged when handled or when they are submitted to any type of external pressure. Most of these foams become more friable over time. As a result, these foams cannot be utilized in many applications where their good insulating and fire resistant properties would otherwise make their use preferable. Such applications include cushioning and insulation where flexibility and elasticity are required to reduce damage that could occur by friction fitting, impact, loading or lifting. In these applications, the known rigid phenolic foams crush under load and remain permanently deformed. Consequently, although the rigid close cell or substantially close cell phenolic foams containing entrapped fluorocarbon blowing agents have excellent insulation properties, their use has been found to be fairly limited.

In the case of open cell phenolic foams, it was thought for a long time that these foams were to be used only in conditions where easy friablity of the product was desired. For example, Smithers in U.S. Pat. No. 2,753,277 describes a material employed for floral supporting means, the material being made of a phenol-formaldehyde foam to which a foaming agent and a catalyst are added. Similar products are described in U.S. Pat. No. 3,049,444 issued to A. M. Palombo who disclosed a cellular synthetic material impregnated with a wetting agent. The synthetic material is a phenol-formaldehyde foam.

In these documents as well as in other U.S. Pat. No. documents such as U.S. Pat. Nos. 3,287,104, 3,697,457 and 4,225,679, phenolic resoles are mixed with a surfactant, a wetting agent, a dye and a blowing agent. The resulting mixture is then reacted with a catalyst, usually an acidic catalyst and allowed to expand and cure to a rigid, hard and highly friable foam, capable of absorbing water and allowing the flower stems to enter the wet foam by applying only a slight pressure.

Thus, none of the open or close cell phenolic foams disclosed in the prior art possess the desired flexibility properties. Furthermore, in both cases, it seemed so far to have been impossible to obtain suitable stable flexibility of the foam while maintaining acceptable insulating and fire resistant properties.

SUMMARY OF THE INVENTION

In accordance with the present invention, there is provided a semi-flexible or flexible phenolic foam composition having a substantially open cellular structure. This composition comprises the reaction product of a mixture of 100 parts by weight of a phenol-aldehyde resin, between 0.5 and 20 parts by weight of a surfactant, from 1 to 20 parts by weight of a blowing agent, optionally between 0 and 10 parts by weight of a wetting agent and from 5 to 20 parts by weight of a an acid catalyst. It is to be noted that throughout this document, the proportions of al the ingredients entering in the composition of the foam are based on 100 parts by weight of resin unless otherwise specified.

Also within the scope of the present invention is a method for producing a semi-flexible or flexible phenolic foam composition having a substantially open cellular structure. The method comprises:

a) mixing a phenol-aldehyde resin with a surfactant, a blowing agent and optionally a wetting agent;

b) curing said mixture by reacting same with an amount of acid catalyst sufficient to initiate curing; and c) compressing the cured or semi-cured product below its original thickness and releasing the pressure, thereby obtaining the desired semi-flexible or flexible phenolic foam composition.

The flexible phenolic foam thereby obtained is not only an excellent insulation material which can be used to replace glass and mineral wool insulation, but also exhibits the excellent fire an smoke resistance properties inherent to phenolic foams. Even though the insulation properties of the semi-flexible or flexible, open cell phenolic foams are lower than those of the closed cell phenolic foams which contain trapped fluorocarbons, it is to be noted that the insulating properties of the semi-flexible or flexible foams are initially only about 30% lower than the insulating properties of the closed cell phenolic foams. Upon aging, the open, perforated but semi-flexible or flexible foam retains its initial insulation value depending mainly on the trapped air.

However, the environment problems associated with the use of the fluorocarbons make the use of the semi-flexible or flexible foams of the present invention particularly desirable. Furthermore, semi-flexible or flexible phenolic foams having almost half the density of the closed cell foams can have about 70% of the initial insulation properties of the closed cell foams. Thus, the main advantages of the semi-flexible or flexible phenolic foams of the present invention is that they possess a lower density which makes them economical and easy to handle. Furthermore, they can be friction fitted, easily cut and packed and used in application where other rigid and friable foams could not be used.

The obtention of a semi-flexible or flexible phenolic foam is a clearly unexpected result since nowhere in the prior art is it disclosed or suggested that the preparation of stable elastic phenolic foams be forseeable or possible. Other advantages of the present invention will be more readily illustrated by referring to the following description.

IN THE DRAWINGS

FIGS. 1A-D represents a top view of the microstructure of a flexible phenolic foam according to a preferred embodiment of the present invention seen through scanning electron microscopy.

FIGS. 2A-D represents a side view of the microstructure of the flexible phenolic foam of FIGS. 1A-D seen through scanning electron microscopy.

FIGS. 3A-D represents a bottom view of the microstructure of the flexible phenolic foam of FIGS. 1A-D seen through scanning electron microscopy.

DETAILED DESCRIPTION OF THE INVENTION

Figure 2A:
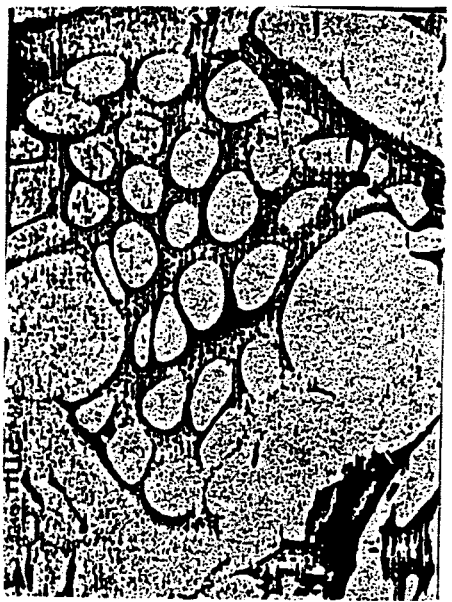
Figure 2B:
Figure 2C:
Figure 2D:
Figure 3A:
Figure 3B:
Figure 3C:
Figure 3D:

The present invention relates to a stable semi-flexible or flexible phenolic foam composition having a substantially open cellular structure. This phenolic foam composition is obtained by preparing a phenolic resin constituted of a suitable phenolic resol, novolak or a mixture of a phenolic resol and a novolak. This phenolic resin is mixed with surfactants, an optional wetting agent which is also acting as a cell opener, a blowing agent or a mixture of blowing agents, desired dye or colouring agents an acid catalyst and optionally compounds capable of improving both the fire and smoke resistance properties of the foam such as borates, phosphates and certain nitrogenous compounds such as amines. The ingredients are mixed together with a high speed, high sheer mixer to form a totally homogeneous mixture which presents a fine but spongy and semi-flexible to almost flexible foam structure upon curing and initial deformation.

Once the cured form has been obtained, it is subjected to deformation by being compressed below its original thickness, preferably by being compressed to between 5 and 60% of its original thickness for a period of time of at least 2 seconds. Once compression is released, the foam regains up to 95% of its original thickness and maintains its semi-flexible or flexible state permanently. This further step of compressing the cut foam slabs or sheets can be done from at least one direction in a squeeze motion during or after the foam has cured in a stationary or continuous production process. The foam may be used as is or neutralized with a gas such as ammonia and washed to neutralize the residual acidity.

The various ingredients entering in the composition of the semi-flexible or flexible phenolic foam of the present invention will be described in further details.

Phenolic Resin

The phenolic resins that can be used in the context of the present invention are to be referred to as phenol-aldehyde resins generally containing one phenol and one aldehyde component. Two general types of phenolic resins that are well known in the art are the novolaks and the resols.

Novolaks

Novalaks are usually prepared by reacting excess amounts of phenol with formaldehyde. The novolak resin molecule is built up from dihydroxyphenylmethane which upon further addition of formaldehyde and immediate condensation of alcohol groups thus formed with another phenol molecule gives linear compounds having the general formula $H[C_6H_3(OH).CH_2]n\ C_6H_4.OH$ as well as branched polymers in which some of the benzene rings have three methylene bridge attachements under acidic conditions. Novolaks can also be made under alkaline conditions and both types of novolaks can be incorporated into a resol, made separately or in-situ for the purpose of producing phenolic foams.

Resols

As general rule, liquid resol resins are prepared by reacting one or more phenols with an excess of one or more aldehydes in aqueous phase and in the presence of an alkaline catalyst. The excess of aldehyde bay be small or large depending on the type of resin required to produce the desired flexible or semi-flexible phenolic foam of the present invention. The chemistry of the phenolic novolaks and resols is well known to those skilled in the art.

Phenol

The term phenol can include not only phenol itself (including pure and technical grade phenol) but also other phenol compounds such as resorcinol, cresol, xylenol, chlorophenol, bisphenol-A, $\alpha$-naphtol, $\beta$-naphtol and the like, and admixtures thereof.

Aldehydes

Aldehydes to be used for reaction with the above-mentioned phenols usually contain about 1 to 8 carbon atoms and preferably about 1 to 3 carbon atoms. Specific examples of aldehydes include formaldehyde, acetaldehyde, propionic aldehyde, furfural, benzaldehyde and the like, and admixtures thereof. In the context of the present invention, the use of formaldehyde is preferred. The most common commercially available forms of formaldehyde include formalin which is usually a 30–52% by weight aqueous solution of formaldehyde in water; paraformaldehyde, which is a solid linear polymer of formaldehyde; and trioxane, which is a solid cyclic tripolymer of formaldehyde. The above and other sources of formaldehyde for reaction with phenol are intended to be embraced herein when the term formaldehyde is used.

In order to achieve maximum flexibility in preparing the phenolic foams of the present invention, it is required that the phenolic resol or the mixture of resols or resols and novolaks that will be used have a phenol to formaldehyde ratio in a range that will readily allow proper cure time. Preferably, the phenol to formaldehyde ratio will range between 1.0 to 2.0 and more preferably a ratio of 1.0 to 1.6 has been found to be the most suitable ratio.

Surfactant

The surfactant may be selected from any suitable stabilizing agent useful in stabilizing liquid phenol-aldehyde resin foams. The surfactant can be anionic, cationic, non-ionic or amphoteric. The only restriction of any significance is the obvious one that it must not interfere with the foaming process. A large number of suitable surfactants are known and are disclosed in numerous publications. In general, the preferred stabilizing agents are water soluble and acid stable surface active agents, and for best results they are also non hydrolyzable. Commonly used surfactants include silicon surfactants such as siloxane-oxyalkylene co-polymers and organic surfactants such as polyethers and polyalcohols, including their condensation products and alkylene oxides such as ethylene oxides and propylene oxides, with alkyl phenols, fatty acids, alkylsilanes and silicons. Specific examples include polyoxyethylene octadecylphenol, polyoxyethylene decylphenol sulphate, polyoxyethylene dodecyl phenol, polyoxyethylene octyl phenol, polyoxyethylene linoleic acid ester, polyoxyethylene stearic acid ester, polyoxyethylene sorbitan monolaurate, polyoxyethylene sorbitan tristearate and the like.

Preferably, for the purposes of the present invention, specific commercially available surfactants are useful. These surfactants include the copolymers manufactured by the Dow Corning Corporation under the trade name "DC193" as well as the Tween TM series of surfactants marketed by ICI Americas Inc.

The type and the percentage of surfactant to be used in the context of the present invention should be properly assessed. The proper surfactant will yield to finer cell structure and thinner cell walls which will promote and favour better flexibility of the final product. The amount of surfactant used will usually be higher than 1% by weight of the phenolic resin. It has been found that a surfactant amount ranging between 2 and 10% by weight of the phenol-aldehyde resin yields the best results. It is to be noted that higher surfactant levels seem to yield foams having a fine cell structure thereby enhancing flexibility of the final product.

Wetting Agent

The use of a wetting agent in the context of the present invention is optional although it usually increases the flexibility of the resulting foam and leaves the cell walls open to release vapor, and dry quickly, and at lower surfactant levels and to allow easier initial deformation. At lower surfactant levels and in the case of inadequate mixing, the use of wetting agents or cell openers becomes essential whereas high levels of surfactant do not usually necessitate the use of a wetting agent. Various types of agents which reduce surface tension may be employed for the purposes of the present invention, including alcohols, glycols, sorbitol and glycerol with sodium laryl ether sulfate or ammonium laryl ether sulfate being preferred. A useful guide in selecting the most suited surfactant and wetting agent is the HLB (Hydrophile-Lipophile Balance) number system developed by ICI Americas Inc.

Blowing Agents

Typical blowing agents which may be employed in preparing the flexible phenolic foam of the present invention include physical and chemical blowing agents as well as mechanical blowing techniques. However, the preferred blowing agent and technique comprise the employment of liquid physical blowing agents, the agents which are volatile liquids introduced into the reaction mixture, and which produce a blowing gas through vaporization of the blowing agent or through decomposition of the blowing agent during the exotherm.

Numerous blowing agents suitable for use in the context of the present invention are well known in the prior art. Ideally, the blowing agent should be a liquid having an atmospheric pressure boiling point between −50° and 100° C. and more preferably between 0° and 50° C. In fact, any compound capable of reaching a gaseous state during curing or capable of generating a gas can be used in the present invention.

Examples of volatile blowing agents include organic compounds such as hydrocarbons, halogenated hydrocarbons, alcohols, ketones and ethers, normally gaseous elemental substances and normally gaseous inorganic compounds. Specific examples of hydrocarbon blowing agents include methane, ethane, propane, butane, octane, isobutane, cyclobutane, pentane, cyclopentane, isopentane, hexane and the corresponding unsaturated derivatives thereof which contain one or more carbon to carbon double bonds. Other suitable blowing agents include chlorinated and fluorinated hydrocarbons such as chloroform, trichlorofluoromethane, 1,1,2-trichloro-1,2,2-trichlorofluoroethane, di-trifluoromethane, 1,2-difluoroethane and 1,1,1,2-tetrachloro-2,2-difluoroethane. Many other blowing agents known to those skilled in the art can be employed in the context of the present invention, although the use of fluorinated blowing agents is not favored because of environmental considerations. Mixtures of one or more blowing agents e.g. liquid-liquid, liquid-gas can be used. Azeotropes of blowing agent mixtures are often used. Preferably, a mixture containing 25% n-hexane and 75% n-penthane is to be used in the context of the present invention. These flammable blowing agents can be replaced partially or completely by non-flammable blowing agents such as CFC's (chloro-fluorocarbons) available or their environmentally safer varieties. Finally, air, liquid air as well as mixtures of gases can also be employed as suitable blowing agents.

The blowing agents are employed in an amount sufficient to give the resulting foam the desired bulk density. In the case of the present invention, the required amount of blowing agent will depend on the density of the final product but will usually range between 5 and 15, preferably between 10 and 15 parts by 100 parts by weight of the phenol-aldehyde resin.

The Catalysts

The catalysts also have a considerable influence on the final flexibility of the semi-flexible or flexible phenolic foam of the present invention. Also, plasticizers added into either the resin mixture or the plasticizing catalysts help to increase the flexibility of the final product. In the broadest aspects of the present invention, the catalyst may be chosen from a wide variety of strong inorganic or organic acid catalysts to be added to this formulation.

Typical acid catalysts suitable for use would include phosphoric and sulphonic acid catalysts such as sulphonic acid, phosphoric acid, toluene sulphonic acid and alkane sulphonic acids such as methane sulphonic acid as well as strong organic acids such as oxalic acid, maleic acid, maleic anhydride, hydrochloric acid and sulphuric acid. Also, the catalysts may be selected from aromatic sulphonic acids such as phenol sulphonic acid, benzene sulphonic acid, toluane sulphonic acid and xylene sulphonic acid (often mixtures of such acids are used without limitation). In the case of the present invention, a particularly preferred catalyst is a mixture containing about 15 parts by weight of 85% phosphoric acid, about 15 parts by of 70% methane sulphonic acid and about 70 parts by weight of 65% phenol sulphonic acid.

In most instances, the acid catalyst is added in amounts sufficient to reduce the initial pH of the liquid resin mixture below 5, preferably between 1.5 and 3.0. Also, the amount of catalyst needed can be determined by evaluating the desired cream times and firm times of the reaction mixture. Generally speaking, however, the concentration of catalyst contained in the foaming reaction mixture will vary between 5 and 20, and preferably in the range 8-15 when the preferred phosphoric acid-methane sulphonic acid-phenol sulphonic acid catalyst described above is used.

Procedure for the Preparation of the Flexible Phenolic Foams

Generally speaking, the first step involved in preparing the semi-flexible or flexible phenolic foams of the present invention comprises mixing the phenol-aldehyde resin with the surfactant, the blowing agent and optionally the wetting agent.

Preferably, this first step of the process comprises mixing 100 parts by weight of the phenol-aldehyde resin with between 0.5 and 20 parts by weight of the surfactant, from 1 to 20 parts by weight of a blowing agent and optionally between 0 and 10 parts by weight of a wetting or cell opening agent.

More preferably, the first step of the process comprises mixing 100 parts by weight of the phenol-aldehyde resin with from 5 to 8 parts by weight of a surfactant, 8 to 10 parts by weight of a blowing agent and 2.5 to 4.0 parts by weight of a wetting agent. The resulting formulation can be mixed using a paint grinder type high speed high sheer mixer until a fully homogenized mixture is obtained. This first mixture is to be referred to as the "resin mixture".

In a separate container, a "catalyst mixture" is prepared. This "catalyst mixture" can contain various amounts of selected catalysts but it has been found that catalyst mixtures containing between 60 and 65 parts by weight of phenol sulphonic acid 65%, between 15 and 20 parts by weight of methane sulphonic acid 70% and from 15 to 25 parts by weight of phosphoric acid 85% are particularly suited for the present invention. The various ingredients of the "catalyst mixture' are to be mixed to homogeneity and stabilized at room temperature.

Once the desired "resin mixture" and "catalyst mixture" have been obtained, the "resin mixture" is cured by pouring same in a mixing container to which the "catalyst mixture" is added in amounts sufficient to initiate curing.

Preferably, between 15 and 20 parts by weight of "catalyst mixture" will be added to 100 parts by weight of the resin mixture. The materials are then mixed at high speed for a time sufficient for the ingredients to be properly mixed prior to foaming. The required time will usually range between 30 and 120 seconds. Once the mixture has been thoroughly homogenized, it should be poured in a low heat conducting mold such as a wooden mold previously heated at a temperature ranging from room temperature to approximately 65° C. in order to avoid heat sink and extra foam skin. The mold and the poured foam is then kept in an atmosphere at a temperature ranging between room temperature and 65° C. in order to allow the foam to cure. The curing time will usually range between half an hour and 24 hours. Once the foam has been properly cured, it should be allowed to stand at room temperature for a period ranging from 2 to 24 hours before cutting and deforming steps are undertaken after the foam has cooled.

Once the foam has been cured and preferably has reached room temperature, it can be cut to the desired thickness. Although at this stage the foam already exhibits some flexibility, it is then subjected to an additional deformation step that will definitely ensure semi-flexibility or flexibility of the final product. Thus, a foam sheet may be placed between two rigid plates and uniform pressure is to be applied to compress the foam sheet below its original thickness. Preferably, the sheet should be compressed to 5 to 60%, more preferably 50 to 60% of its original thickness. The pressure should be held for a period of time sufficient to ensure permanent flexibility or semi-flexibility of the foam upon release. Preferably, a compression time of at least 2 seconds, more preferably from 2 to 60 seconds and still more preferably about 10 seconds is contemplated after which the pressure is to be released. Once the pressure has been released, the phenolic foam will regain approximately 50 to 95% of its original thickness and will remain permanently deformed and semi-flexible or flexible. The deformation step described above is essential to coil the cells which will remain permanently deformed and flexible.

The above-noted process can be fully automated through already available automatic proportioning, mixing, foam lay-down, curing, cutting and deformation equipment used for other foam systems. With only minor modifications, existing manufacturing units can be adapted to produce the flexible phenolic foams of the present invention. Therefore, the composition of the present invention can be produced via the manual single pour, multiple pour, continuous bun process or via the multiple component manual or automated dispensing machines in combination with continuous slab sheet production techniques.

The following example is introduced to illustrate rather than limit the scope of the present invention.

EXAMPLE 1

Preparation of a Flexible Phenol-Formaldehyde Foam

A. Preparation of a phenol-formaldehyde resin

In a glass reaction vessel equipped with a stirrer, condenser, thermometer and vacuum distillation equipment were loaded 940 grams of phenol and 840 grams of 50% aqueous formaldehyde. After the reaction mixture had been cooled to a temperature ranging between 40° and 45° C., 25% aqueous sodium hydroxide was added in sufficient amounts to adjust the pH of the reaction mixture to a value ranging between 8.7 and 8.8. The mixture was then heated under constant mixing to a temperature in the area of 50° to 52° C. and allowed via exothermic reaction to reach atmospheric reflux at 100°-103° C. at sea level. The atmospheric reflux was held until over 95% of the formaldehyde was reacted and until a batch sample, when cooled to 30°-35° C., showed turbidity. The reaction mixture was then cooled to 50°-55° C. and neutralized with concentrated formic acid to a pH value of 7.2-7.4. The resulting resol was then vacuum distilled to a viscosity of 4,000-5,000 centipoise at 25° C. without letting the reaction temperature exceed 60° C. The resulting resin was cooled and stored in a refrigerated storage area.

B. Preparation of a Flexible Phenol-Formaldehyde Foam

1° Preparation of the Resin Mixture 100 parts by weight of the phenolic resin obtained in A. were mixed with 4 parts by weight of the surfactant sold by ICI Americas Inc. under the trade name G-1292, two parts by weight of the surfactant marketed by Dow Corning Corporation under the trade name DC-193, two parts by weight of the wetting or cell opening agent marketed by Alcolac under the trade name L-22 and 15 parts by weight of a blowing agent containing 75% n-pentane and 25% n-hexane. All the ingredients were mixed together for 1 minute using high speed high sheer mixing until the mixture had completely homogenized. The temperature of the mixture was maintained at 20° C.

2° Preparation of the Catalyst Mixture 70 parts by weight of 65% phenol sulphonic acid, 15% parts by weight of 70% methane sulphonic acid and 15% by weight of 85% phosphoric acid were mixed together and the mixture was stabilized at a temperature ranging between 20° and 25° C.

3° Preparation of the Flexible Phenolic Foam 85 parts of the resin mixture prepared in 1° were poured in a mixing container and 15 parts of the catalyst mixture prepared in 2° were added. The materials were mixed together at 3000 rpm for a time sufficient to properly mix the ingredients prior to foaming. The resulting mixture was poured into a wooded box mold preheated to 45° C. and the mixture was allowed to freely rise. Once the mixture was rised, the mold was maintained at a temperature ranging between 45° C. in order to allow the foam to cure for a period of about 2 hours. After curing, the foam was allowed to stand at room temperature for 25 hours.

Once the foam has thoroughly cured, it is cut to the required thickness. At this stage, the foam is already semi-flexible but it must be subjected to a deformation step before being flexible. A 25 mm thick foam sheet was placed between two steel plates and uniform pressure was applied to squeeze the 25 mm foam to a deformation thickness of 15 mm. The pressure was held for 10 seconds and then released. The foam regained about 5 mm of its thickness reaching a final stable thickness of 20 mm. Thus, the foam regained 80% of its original thickness and remained permanently flexible.

Table 1 shows some of the properties of the flexible phenolic foam of the present invention when compared with a rigid closed cell phenolic foam.

TABLE I

| PRODUCT | FLEXIBLE PHENOLIC FOAM | RIGID-CLOSED CELL PHENOLIC FOAM |
|---|---|---|
| Density (Pounds/Cu. Ft.) | 1.0–1.5 | 2.0–3.0 |
| k. factor (BTU/inch/hour/foot$^2$/°F.) | 0.22–0.24 | 0.13–0.15 |

Table 2 illustrates other properties of the flexible phenolic foam of the present invention when compared to the flexible polyurethane foams.

TABLE 2

| PHYSICAL PROPERTIES | FLEXIBLE PHENOLIC FOAM | | FLEXIBLE POLYURETHANE |
|---|---|---|---|
| Density (pcf) | 1.0 | | 1.0 |
| Cell Structure | open | | open |
| Orientation (direction) | X | Z | Z |
| Compressive Strength at 25% Deformation (kpa) | 1.65 | 5.4 | 4.4 |
| Tensile Strength (kpa) | 33.0 | 12.0 | 80.0 |

The flexible foam obtained in Example 1 was subjected to cyclic compressive tests and the results are listed in Table 3.

TABLE 3

Cyclic Compressive Strength Test

| Sample Conditioning | Testing Orientation | Cyclic Compressive Strength (kPa) | | | Initial (mm) | Thickness % Change Relative to Initial | | | |
|---|---|---|---|---|---|---|---|---|---|
| | | Initial at 25% Deformation | At 60% Deformation | | | After 10 Cycles | 2 hrs. After 10th Cycle | After 80th Cycle | 2 hrs. After 80th Cycle |
| | | | 10 Cycles | 80 cycles | | | | | |
| As received | Z | 5.4 | 24.8 | 22.7 | 52.0 | −21.9 | −17.5 | −26.7 | −25.2 |
| 80° C. for 7 days | Z | 7.8 | 31.7 | 23.3 | 53.2 | −22.0 | −18.6 | −26.9 | −25.8 |
| 70° C. and 95% R.H. for 7 days | Z | 7.0 | 26.9 | 25.7 | 55.2 | −22.2 | −18.3 | −29.0 | −26.6 |

NOTE:
*The same sample was used for the initial 25% deformation and the 60% deformation tests.
Minus % change means the sample was compressed and became thinner.

Finally, the flexible phenolic foam of the present invention was subjected to dimensional stability tests and the results are demonstrated in Table 4.

TABLE 4

| Sample Conditioning | % Change | | | | |
|---|---|---|---|---|---|
| | Length | Width | Thickness | Weight | Density |
| Heat Aging (80° C. for 7 days) | −0.5 | −0.8 | +0.9 | −7.4 | −6.7 |
| Heat and Humid Aging (70° C., 90% Relative Humidity for 7 days) | 0 | +0.2 | +5.1 | −3.3 | −8.6 |

Claims to the invention follow.

I claim:

1. A semi-flexible or flexible phenolic foam composition having a substantially open cellular structure comprising the reaction product of a mixture of 100 parts by weight of the reaction product of a phenol-aldehyde resin, between 0.5 and 20 parts by weight of a surfactant, from 1 to 20 parts by weight of a blowing agent; optionally between 0 and 10 parts by weight of a wetting agent and from 5 to 20 parts by weight of an acid catalyst, the foam composition having a density lower than 2 lbs/cu ft and being compressed to have a thickness between 50 and 95% of its original thickness.

2. A semi-flexible or flexible phenolic foam composition according to claim 1, which comprises from 0.5 to 10 parts by weight of a wetting agent.

3. A semi-flexible or flexible phenolic foam composition according to claim 1, which comprises from 2.5 to 4.0 parts by weight of a wetting agent.

4. A semi-flexible or flexible phenolic foam composition according to claim 1, wherein the phenol-aldehyde resin is a phenol-formaldehyde resin.

5. A semi-flexible or flexible phenolic foam composition according to claim 4, wherein the phenol to formaldehyde ratio ranges between 1.0 and 2.0.

6. A semi-flexible or flexible phenolic foam composition according to claim 1, wherein the phenol-aldehyde resin is selected from the group consisting of novolaks, resols and mixtures thereof.

7. A semi-flexible or flexible phenolic foam composition according to claim 4, wherein the phenol component of the phenol-aldehyde resin is selected from the group consisting of resorchrinol, cresol, xylenol, chlorophenol, bisphenol-a, α-naphtol and β-naphtol.

8. A semi-flexible or flexible phenolic foam composition according to claim 1, which additionally comprises a compound capable of improving the fire and smoke resistance properties of said foam.

9. A process for producing a semi-flexible or flexible phenolic foam composition having a substantially open cellular structure, said process comprising:
  a) mixing a phenol-aldehyde resin with a surfactant, a blowing agent and optionally a wetting agent;
  b) curing said mixture by reacting same with an amount of acid catalyst sufficient to initiate curing; and
  c) compressing the cured or semi-cured product between 5 and 60% of its original thickness and releasing the pressure, thereby obtaining the desired semi-flexible or flexible phenolic foam composition having a density lower than 2 lbs/cu ft.

10. A process according to claim 9, wherein 100 parts by weight of a phenol-aldehyde resin are mixed with between 0.5 and 20 parts by weight of a surfactant, from 1 to 20 parts by weight of a blowing agent and optionally between 0 and 10 parts by weight of a wetting agent or cell opening agent.

11. A process according to claim 9, wherein the cured product is compressed to from 5 to 60% of its original thickness for a period of at least 2 seconds.

12. A process according to claim 9, wherein the cured product is compressed to form 50 to 60% of its original thickness for a period of at least 2 to 10 seconds.

13. A process for producing a semi-flexible or flexible phenolic foam composition having a substantially open cellular structure, said process comprising:
  a) mixing at high speed 100 parts by weight of a phenolic resin with from 5 to 8 parts by weight of a surfactant, 2.5 to 4.0 parts by weight of a wetting agent and from 8 to 10 parts by weight of a blowing agent;
  b) curing said mixture with between 15 and 20 parts by weight of an acid catalyst; and
  c) compressing the cured product to between 5 and 60% of its original thickness for a period of time ranging between 2 and 60 seconds and releasing the pressure, thereby obtaining the desired semi-flexible or flexible phenolic foam composition.

14. A process according to claim 13, wherein the phenolic resin is a phenol-aldehyde resin.

15. A process according to claim 13, wherein the phenolic resin is selected from the group consisting of novolaks, resols or mixtures thereof.

16. A process according to claim 13, wherein the phenolic resin is a phenol-formaldehyde resin.

17. A process according to claim 13, wherein the said catalyst is a mixture containing between 60 and 65 parts by weight of 65% phenol sulphonic acid, between 15 and 20 parts by weight of 70% methane sulphonic acid and between 15 and 25 parts by weight of 85% phosphoric acid.

18. A process according to claim 13, wherein the cured product is compressed to form 50 to 60% of its original thickness for a period of 10 seconds.

19. A semi-flexible or flexible phenolic foam composition having a substantially open cellular structure obtained by the process comprising the steps of:
  a) mixing a phenol-aldehyde resin with a surfactant, a blowing agent and optionally a wetting agent;
  b) curing said mixture by reacting same with an amount of acid catalyst sufficient to initiate curing; and
  c) compressing the cured or semi-cured product to have a thickness between 5 and 60% of its original thickness and releasing the pressure, thereby obtaining the desired semi-flexible or flexible phenolic foam composition having a density below 2lbs/cu ft.

20. A semi-flexible or flexible phenolic foam composition according to claim 19, wherein 100 parts by weight of a phenol-aldehyde resin are mixed with between 0.5 and 20 parts by weight of a surfactant, from 1 to 20 parts by weight of a blowing agent and optionally between 0 and 10 parts by weight of a wetting agent or cell opening agent.

21. A semi-flexible or flexible phenolic foam composition according to claim 19, wherein the cured or semi-cured product is compressed to from 5 to 60% of its original thickness for a period of at least 2 seconds.

22. A semi-flexible or flexible phenolic foam composition according to claim 19, wherein the cured or semi-cured product is compressed to from 50 to 60% of its original thickness for a period of at least 2 to 10 seconds.

23. A semi-flexible or flexible phenolic foam composition having a substantially open cellular structure, obtained by the process comprising the steps of:
  a) mixing at high speed 100 parts by weight of a phenolic resin with from 5 to 8 parts by weight of a surfactant, 2.5 to 4.0 parts by weight of a wetting agent and from 8 to 10 parts by weight of a blowing agent;
  b) curing said mixture with between 15 and 20 parts by weight of an acid catalyst; and
  c) compressing the cured or semi-cured product to between 5 and 60% of its original thickness for a period of time ranging between 2 and 60 seconds and releasing the pressure, thereby obtaining the desired semi-flexible or flexible phenolic foam composition having a density below 2lbs/cu ft.

24. A semi-flexible or flexible phenolic foam composition according to claim 23, wherein the phenolic resin is a phenol-aldehyde resin.

25. A semi-flexible or flexible phenolic foam composition according to claim 23, wherein the phenolic resin is selected from the group consisting of novolaks, resols or mixtures thereof.

26. A semi-flexible or flexible phenolic foam composition according to claim 23, wherein the phenolic resin is a phenol-formaldehyde resin.

27. A semi-flexible or flexible phenolic foam composition according to claim 23, wherein said catalyst is a mixture containing between 60 and 65 parts by weight of 65% phenol sulphonic acid, between 15 and 20 parts by weight of 70% methane sulphonic acid and between 15 and 25 parts by weight of 85% phosphoric acid.

28. A semi-flexible or flexible phenolic foam composition according to claim 23, wherein the cured product is compressed to from 50 to 60% of its original thickness for a period of 10 seconds.

* * * * *